March 2, 1971  D. D. JANSSEN  3,566,587
HEADER CONTROL SYSTEM FOR MECHANICAL COTTON PICKING MACHINE
Filed Oct. 9, 1968  2 Sheets-Sheet 2
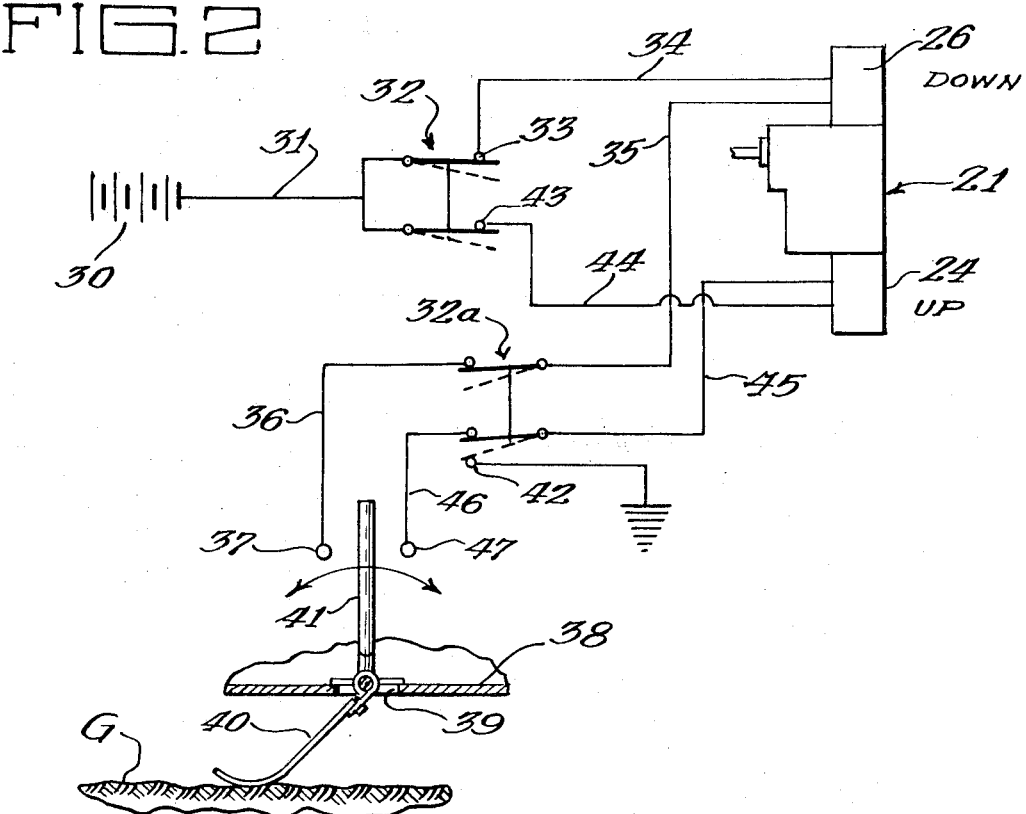
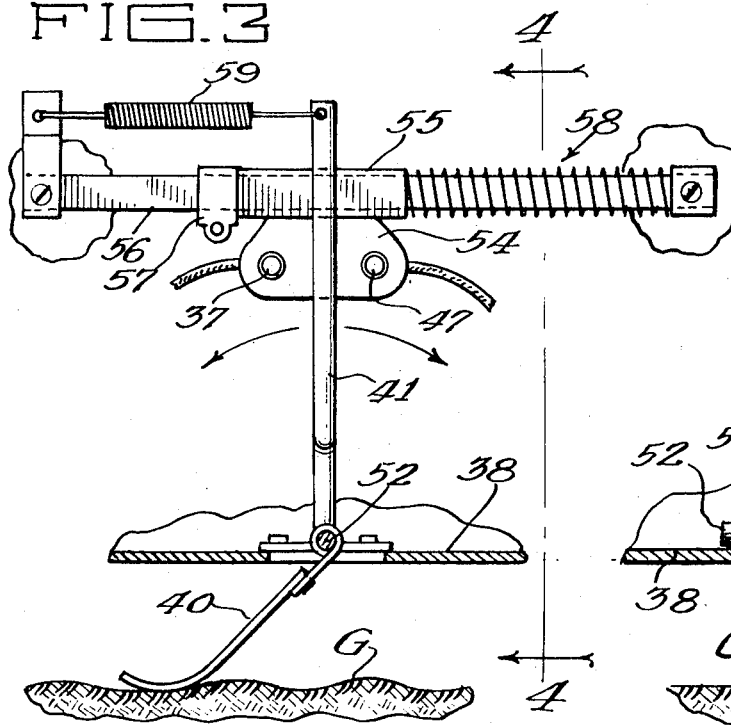
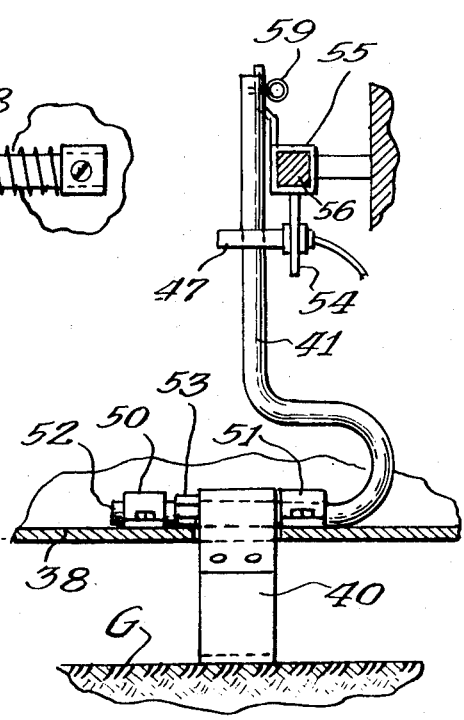

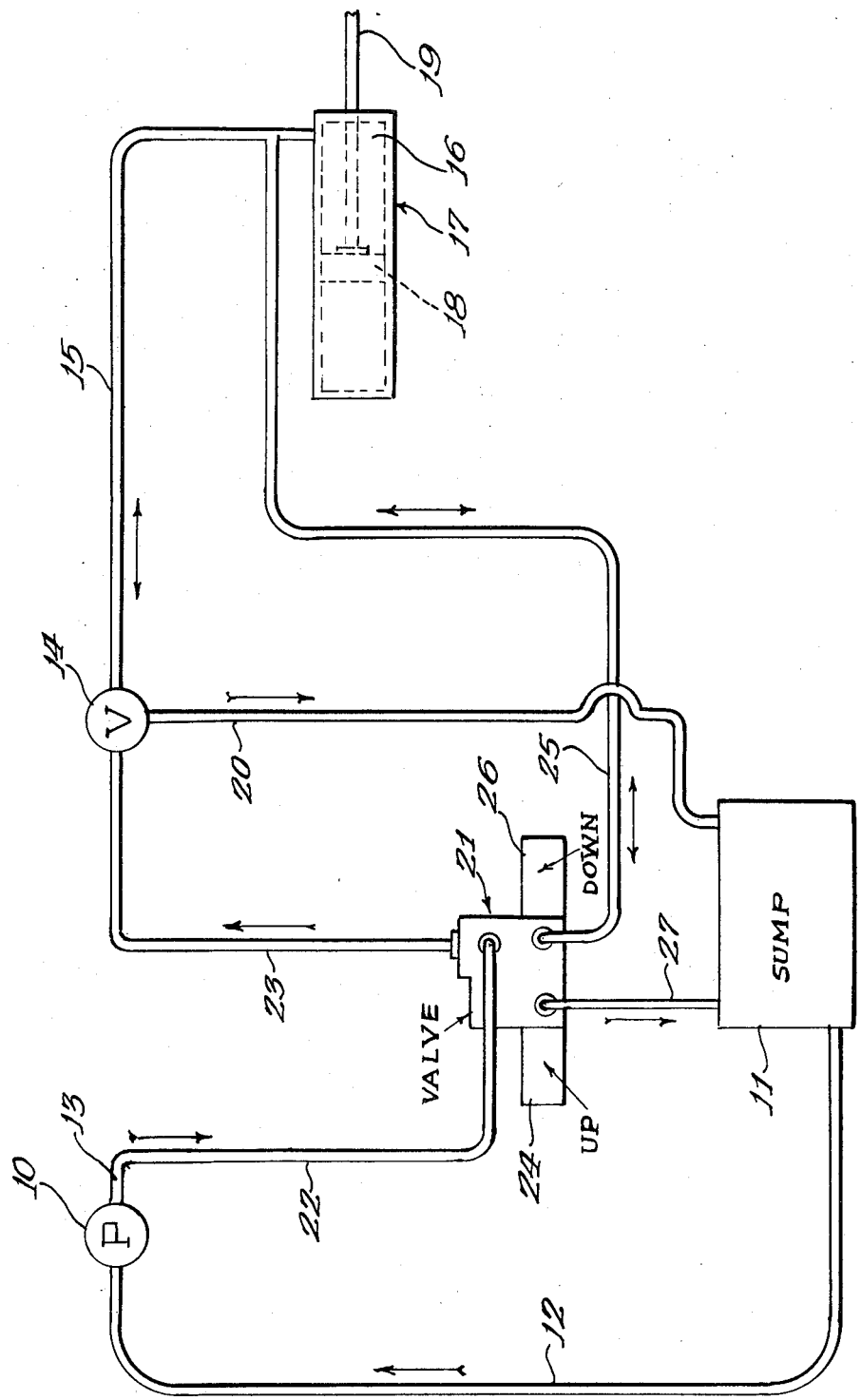

United States Patent Office 3,566,587
Patented Mar. 2, 1971

3,566,587
HEADER CONTROL SYSTEM FOR MECHANICAL COTTON PICKING MACHINE
Donald D. Janssen, Sac City, Iowa, assignor to Noble Manufacturing Company
Filed Oct. 9, 1968, Ser. No. 766,068
Int. Cl. A01d 67/00
U.S. Cl. 56—11
5 Claims

ABSTRACT OF THE DISCLOSURE

A control system for hydraulically raising and lowering cotton picking machine headers involving an electrical-hydraulic circuitry supplemental to the hydraulic power system of the machine and in which ground level is sensed mechanically to operate electrical circuitry feeding signal to hydraulic power to the raising and lowering mechanism in parallel with the hydraulic circuitry on the machine.

BACKGROUND OF THE INVENTION

Mechanical cotton picking machines have had either one or two headers with rotating spindles attacking cotton plants in a row from either side to remove ripe cotton from the plant without particular damage to the plant. Early planted cotton and/or dry weather after planting may cause the cotton bolls to form on the plants close to the ground. Under such conditions, the headers must either run close to ground or miss considerable crop. Earth picked up is very deleterious to the spindle mechanism, causing costly repairs, and should such dirt be conveyed into picked cotton, it is considered a contaminate lowering the price obtainable for the cotton.

The headers are relatively heavy units raised and lowered hydraulically with a ram obtaining its power from a pump and circuit operated from the moving engine power of the picking machine. A manual control valve at the driver's seat has usually been provided by which the driver can adjust the height of the headers according to his visual assessment of ground conditions traversed. Often, cotton picking occurs in dry conditions with dust in the field, obscuring the ground from the elevated position of the machine driver. Also, the machines are mounted with relatively large rubber tires and are subject to bouncing during movement through the field, further complicating the manual adjustment of header elevation.

Attempts have been made to provide ground sensing automatic controls; however, their complicated mechanisms have not proved satisfactory. Illustrative of the latter are U.S. Pats. Nos. 2,660,015 and 3,267,653. Cotton picking machine header mechanisms may be illustrated by International Harvester Pats. 2,934,878 and 3,046,721 for spindle details, and John Deere Pats. 3,028,-718 and 3,043,075.

SUMMARY OF THE INVENTION

This invention relates to an electrical-hydraulic control system for controlling automatically the height of a cotton picking machine header in the field wherein the system is auxiliary to and supplements the manually controlled hydraulic system on the picking machine.

An object of this invention is to provide such a control system, operative at will of the machine operator, which takes its power from the machine and has circuitry supplementary to machine circuits in order to raise and lower the headers in response to ground level sensed.

A further object is to provide the foregoing control circuitry in a manner to avoid influencing or affecting operation of the manual controls of the machine.

Another object is to provide in such a control circuit means automatically operable to raise the cotton picking machine headers and return them to lower operative position, as for example, when the machine and driver reach the end of a field row of cotton and are engaged in turning the machine around to start along adjacent cotton rows.

Another object is to provide such a control combining mechanical ground level sensing, converting such sensing into electrical signals, and using such electrical signals in operating a hydraulic auxiliary power circuit to the raising and lowering mechanism on the picking machine.

Other objects, advantages and features of the invention may appear from the accompanying drawings, the following description, and the appended claims.

BRIEF DESCRIPTION OF THE DRAWINGS

FIG. 1 is a hydraulic circuit diagram used with the invention.

FIG. 2 is an electrical circuit diagram used with the invention.

FIG. 3 is a side elevational view of the ground sensing mechanism.

FIG. 4 is a front elevational view of the ground sensing mechanism.

DESCRIPTION OF THE PREFERRED EMBODIMENTS

The present system may be installed on cotton picking machines which are of recent manufacture as well as those in existence for some time. The machines generally have a small hydraulic pump driven by the engine which provides power for all the functions of the machine. The header or headers are provided with a hydraulic ram-powered mechanism for raising and lowering the headers and such mechanism remains on the machine and fully operative as it was before installation of the control. Some machines have a single header capable of picking cotton from one row in the field at a time. Other machines may have two headers, one for each of two rows picked at a time. Each header may be raised or lowered by its own ram and in other instances, the two headers may be coupled for raising and lowering together. These mechanisms are known. The present control system is added to the machine and is shown herein with the assumption that the mechanisms of the cotton picking machine itself are known.

FIG. 1 shows the hydraulic circuitry associated with one valve of a control system. The circuitry would be duplicated if the control system were installed upon a cotton picking machine having two headers separately controlled.

A pump 10, generally mounted upon the engine of the machine, receives oil from a container or sump 11 through a connecting line 12 in order to deliver oil or other hydraulic fluid into an outlet line 13. On the machines as manufactured, for example, by John Deere or International Harvester as well as others, the outlet 13 would be led directly from pump 10 to a manually controlled valve 14 whereby fluid power may be conducted through line 15 into the cap and 16 of the hydraulic ram 17. The admission of fluid will generally cause the piston 18 on the ram to move in a direction drawing in the piston rod 19 and operating through links and levers to raise the header. The manual valve 14 may also be manipulated to allow fluid in line 15 to pass through line 20 into the sump 11, thus allowing the header to lower, which generally occurs by gravity. In such a hydraulic system, fluid pressure is available at the valve 14 but is not constantly circulated, thereby building up heating problems.

The control system of this invention provides an auxiliary circuit to raise and lower the headers through the action of the ram 17. A 3-way valve 21, spring centered to an off position and solenoid operated, is provided with the source of the fluid power from the pump 10 through outlet 13 and line 22 carrying fluid to the valve and line 23 completing the loop to the manual control valve 14. A solenoid 24 on the left-hand end of the valve shown, when activated, will move the spool in the valve to connect line 22 with hydraulic line 25 connected into the cap end of the ram close to the ram. As soon as excitation of solenoid 24 discontinues, the valve will return to a position stopping the flow just mentioned.

On the right-hand side of the valve shown in FIG. 1 is a separate solenoid 26 operating upon the spool of the valve when excited to lower the header by connecting the line 25 to a line 27 by which fluid may flow from the line into the sump 11. One such valve to connecting lines and solenoids will be provided for each ram to be separately controlled. If the machine has two headers, intended to rise and fall together, and two rams are provided, they may be cross-connected and controlled by a single valve. One of the advantages found in the experimental use of the present control system has been that there is no substantial build up of heat in the hydraulic circuit. The fact that the circuit is auxiliary to the main circuit on the machine allows flow only when the controls call for a raising or lowering of the headers.

In FIG. 2, the electrical circuitry is shown in which a power source 30, such as the battery generator set accompanying the engine of the cotton picking machine, is connected by appropriate line 31 into a switch 32 which is actually ganged with what is shown as a second part 32a, so that the switch has three positions. One position is "OFF", disengaging power to the electrical circuit; a second position is marked "AUTO", indicative of an automatic operation of the control whereby the raising and lowering of the ram is to be accomplished as a slave to the ground sensing unit and the third position is marked "MAN", standing for manual, but in effect automatically operating to raise the headers to their fullest extent such as when the cotton picking machine has reached the end of a row in a field and the headers need to be raised while the machine is turning around to approach an adjacent row.

It may be noted that the power source is connected from a terminal 33 and line 34 to the down solenoid 26, the circuit being completed through line 35, switch parts 32a, and a line 36 from that switch part to a terminal pin 37 from a part of the mechanical ground sensing mechanism. Quite similarly, a terminal 43 is connected through line 44 to the up solenoid 24, its circuit being completed by line 45 through the switch 32a and line 46 to another terminal pin 47, also a part of the ground sensing mechanism. It should be understood that the switch in the electrical circuitry is mounted near the driver of the machine; the hydraulic valve may be at any convenient location on the machine frame; and the ground sensing unit will be mounted in the lower plate on the header. In the latter connection, the lower plate 38 of the header is shown as having an opening 39 therein by which a ground feeling paddle 40 may ride up and thus sense level of the ground G, and by moving upwardly and downwardly, swing a movable contact 41 against one of the contact pins 37 or 47 to complete a circuit to the respective solenoids. In operation, with the switch 32 positioned on automatic which will place the switch part 32a so as to connect the terminals in lines 36 and 46, thus placing the terminal pins 37 and 47 in an active circuitry to complete the circuit to either solenoid upon touching the movable contact 41. As the ground paddle 40 raises, the movable contact may swing over against the up solenoid contact pin 47. When this occurs, the up solenoid is energized, setting the valve 21 to admit fluid to the ram. As soon as the header rises, the ground paddle may swing back away from the contact pin 47, deenergizing the up solenoid so that the movement stops. The down solenoid is similarly energized should the movable contact 41 swing to the left, as in FIG. 2, against the contact pin 47. The action of the solenoid is to set the valve 21 to allow fluid flow out of the ram, thus lowering the header.

The switch setting to manual referred to above does nothing more than to change the switch part 32a so as to break the continuity of the line 36 to the down solenoid and to connect the switch part to a terminal 42, which is grounded as shown, so that the up solenoid is immediately and automatically energized. The valve 21 is set to raise the header. The movable terminal will swing over against the terminal pin 37 but will be ineffective due to the breaking of the circuit in the line 36. This operation provides a convenient means for the operator to raise his headers by the switch 32 alone while turning around at the end of a field. Immediately upon returning the switch to automatic, the down solenoid is energized and the headers lower until the ground sensing mechanism again touches ground to govern the header levels.

The details of the ground sensing mechanism are shown in FIGS. 3 and 4. It may be noted in FIG. 4 that the movable terminal 41 has a goose-necked shape which can extend over the top of the floor plate 38 of the header and be received loosely and pivotally in bearing straps 50 and 51. The end portion 52 of the movable contact is threaded so as to receive a lock nut 53 capable of securing the paddle 40 in an adjusted position angularly related to the upstanding part of the movable contact.

The terminal pins 37, 47 are mounted in insulated fashion in a plate 54 secured to a rectangular sleeve 55 which may traverse a square rod 56 mounted in a convenient spot on the header. Collar 57 prevents the sleeve from moving to the left as shown in FIG. 3 but it can freely move, compressing spring 58, in a right-hand direction. This prevents damage to the mechanism should a high ground area be suddenly and quickly sensed by the ground paddle 40. A light tension spring 59 on the upper end of the movable contact insures that the ground paddle will be pressed down toward the ground.

The cotton picking machine is often used in dry conditions where the ground is not particularly visible to the driver of the machine, and thus an automatic control is desirable. It makes little difference where the ground sensing control is mounted so long as it is on the header. Since an adjustment between the swinging movable contact and the ground feeling paddle is available, the angular relationship may be changed for the particular field conditions to insure the proper running height of the headers. In some cotton growing conditions, bolls of cotton may be formed on the cotton plant stem within two or three inches of the ground. It is important to pick cotton from such levels without bringing dirt into the spindles and into the vacuum system of the cotton picking machine, and the present control, utilizing mechanical ground sensing, electrical signal transmission to a hydraulic circuit, may admirably and quickly control header height automatically.

The foregoing detailed description has been given for clearness of understanding only, and no unnecessary limitations should be understood therefrom, as some modifications may be obvious to those skilled in the art.

I claim:

1. A header control system for a mechanical cotton picking machine having at least one hydraulic lift ram for its header and manually controlled hydraulic power circuitry to the ram, comprising:
   a supplemental fluid power circuit in parallel with said hydraulic power circuitry,
   a valve in the supplemental circuit for directing hydraulic flow to and from said ram separately from said manually controlled hydraulic circuitry,
   electrical solenoid valve position controls for said valve, one of said solenoid valve position controls for setting the valve to introduce fluid power to the ram to raise the header, another of said solenoid valve position controls for setting the valve for exhausting fluid from the ram to lower the header, a source of electrical supply to the solenoid controls, and a movable ground engaging and sensing mechanism on the picking machine and having spaced electrical switch contacts, each connected to one respective solenoid control, a movable member engageable with said spaced switch contacts responsive to rise and fall of ground level sensed by such mechanism relative to the header, engagement of such movable member and one of the spaced switch contacts completing an electrical circuit to the connected solenoid control.

2. A header control system as specified in claim 1 including switch means for simultaneously disengaging said spaced contacts from the solenoid controls and completing said electrical circuit to the solenoid control for raising the header whereby automatically to raise the header without use of the manually controlled hydraulic power circuitry to the ram.

3. A header control system as specified in claim 1 wherein the ground engaging and sensing mechanism has a paddle for sliding ground engagement and the movable electrical member is connected to such paddle adjustably, permitting selection of desired height of the cotton picking header relative to ground level.

4. A header control system as specified in claim 1 wherein the electrical solenoid valve position controls include a master on-off switch for the entire system and a separate switch means for activating the valve control solenoid for raising the header temporarily disengaging the valve control solenoid for lowering the header.

5. A header control system as specified in claim 1 wherein hydraulic lines are connected between a hydraulic pump on the cotton picking machine and the solenoid controlled valve in the supplemental circuit, and a hydraulic line connects such valve and the ram, the latter line bypassing all manual hydraulic controls on the picking machine.

References Cited

UNITED STATES PATENTS

| | | | |
|---|---|---|---|
| 2,473,655 | 6/1949 | Lohn | 56—208 |
| 2,750,727 | 6/1956 | Wright | 56—208 |
| 2,972,847 | 2/1961 | Matthews, Jr. | 56—217X |
| 3,163,974 | 1/1965 | Mack | 56—214 |
| 3,222,851 | 12/1965 | Schnaidt et al. | 56—11 |
| 3,269,685 | 8/1966 | Wallace | 56—210X |
| 3,286,448 | 11/1966 | Moore | 56—208 |

FOREIGN PATENTS 809,831   3/1959   Great Britain.

LOUIS G. MANCENE, Primary Examiner

J. A. OLIFF, Assistant Examiner

U.S. Cl. X.R.

56—208